United States Patent [19]

Tambini

[11] Patent Number: 4,823,616

[45] Date of Patent: Apr. 25, 1989

[54] TORQUE AND ANGULAR DISPLACEMENT SENSING IN YIELD THRESHOLD CONTROLLED WRENCHES

[75] Inventor: Angelo Tambini, Kilbride, Ireland

[73] Assignee: SPS Technologies, Inc., Newtown, Pa.

[21] Appl. No.: 67,896

[22] Filed: Jun. 29, 1987

[51] Int. Cl.[4] ...................... B23P 19/06; B25B 23/143

[52] U.S. Cl. .............................. 73/862.23; 73/862.25; 81/470

[58] Field of Search ........... 73/862.21, 862.23, 862.24, 73/862.25, 862.37, 761; 81/467, 470; 173/12

[56] References Cited

U.S. PATENT DOCUMENTS 2,836,090 5/1958 Ray ................................ 81/470 X
2,973,676 3/1961 Nelson ................................ 81/470
4,294,110 10/1981 Whitehouse ..................... 73/862.23
4,620,450 11/1986 Yamaguchi ..................... 73/862.23

*Primary Examiner*—Charles A. Ruehl
*Attorney, Agent, or Firm*—James D. Dee; Aaron Nerenberg

[57] ABSTRACT

The torque and angular displacement transducers in a yield threshold controlled wrench apparatus are relocated to reduce the problems encountered therewith from the harsh physical environment experienced by such transducers in conventional designs. In one preferred embodiment, both the torque and angular displacement transducers are located at completely remote locations from the movable elements of the wrench mechanism and are each housed in a conventional hydraulic fitting to be more readily replaceable for maintenance purposes, as compared to the transducers of conventional designs.

13 Claims, 1 Drawing Sheet

TORQUE AND ANGULAR DISPLACEMENT SENSING IN YIELD THRESHOLD CONTROLLED WRENCHES

BACKGROUND OF THE INVENTION

When a plurality of parts or subassemblies are joined in a composite assembly which is secured by fasteners having threaded members, it is often desirable to tighten such threaded members at each joint until a yield threshold is reached thereat. A continual clamping force or load, similar to that applied by a lock washer, is exerted in this way to insure the integrity of the joint. This is particularly true where structural members are joined in the composite assembly and the yield threshold reached at any joint relates to the male fastener. Hydraulic or pneumatic power wrench mechanisms are commonly utilized for tightening the fasteners which join structural members and circuitry for detecting the yield threshold at such structural joints is well known in the art. Such circuitry includes signal processing means for indicating when the yield threshold of a joint has been reached, as disclosed and claimed in U.S. Pat. No. 4,104,779 and 4,211,120. The signals processed by such circuitry are sensed concurrently and usually relate to the torque applied in tightening the fastener and the angular displacement of the fastener during tightening. In hydraulic power wrench mechanisms, it is conventional to utilize strain gauges disposed on the lever arm through which force is applied to turn the fastener, as the transducer means for sensing the torque. The conventional transducer means for sensing the angular displacement in such hydraulic power wrench mechanisms, is a potentiometer disposed along the turn axis of the wrench head through which torque is applied to the fastener. Because of their location relative to the moving parts of the power wrench mechanism, the strain gauges and potentiometer are subject to a harsh physical environment which results from vibration and exposure to damage, with the potentiometer being particularly vulnerable. Furthermore, unless costly slip rings are utilized within the pivotal joints of the wrench mechanism, wires from such transducers will also be exposed to the same harsh environment and therefore, may be the cause of open circuits and dead or intermittent shorts in the signal processing circuitry. Also, installation of these transducers on the wrench mechanism is an intricate task which must be laboriously repeated whenever the transducers fail or the wrench mechanism is modified or maintained.

SUMMARY OF THE PRESENT INVENTION

It is the general object of the present invention to remove either or both the angular displacement and the torque transducers from their conventional locations on the wrench mechanism in a yield threshold controlled wrench apparatus and thereby moderate the harsh physical environment otherwise encountered thereat.

It is the specific object of the present invention to utilize transducer means for sensing either or both the angular displacement and torque, which is easily installed at completely remote locations from the harsh physical environment on the wrench mechanism in a yield threshold controlled wrench apparatus.

Relative to the torque transducer, these and other objects are accomplished with a pressure sensor disposed in the network through which the fluid medium passes to power the wrench mechanism. In regard to the angular displacement transducer, these and other objects are accomplished in one embodiment with a flow sensor disposed in the network throuqh which the fluid medium passes to power the wrench mechanism. In another embodiment, a potentiometer is utilized as the angular displacement transducer and is disposed at a location on the wrench mechanism removed from the particularly harsh physical environment at its conventional location along the turn axis of the wrench head.

When utilized the pressure and flow sensors are housed in conventional fittings that can be easily installed as desired in the network through which the fluid medium passes to power the wrench mechanism. The scope of the invention is only limited by the appended claims for which support is predicated on the preferred embodiments hereinafter set forth in the following description and the attached drawings.

DESCRIPTION OF THE PREFERRED EMBODIMENTS

This invention relates to yield threshold controlled wrench apparatus that derives the yield threshold from concurrently monitored signals relating to the torque applied in tightening the fastener and the angular displacement of the fastener during tightening. Conventionally, such apparatus includes a power wrench mechanism and circuit means for processing the torque and angular displacement signals to produce an indication when the yield threshold is reached. The power wrench mechanism is driven by a pressurized fluid to turn a wrench head which tightens the fastener and either a hydraulic or pneumatic fluid may be utilized. Furthermore, the power wrench mechanism may have any conventional design, such as that of a pneumatic rotary wrench or a hydraulic ratchet wrench.

In its broadest scope, the invention utilizes a transducer means for sensing such torque and/or angular displacement in direct proportion to a characteristic of the fluid medium. Relative to the torque, such transducer means monitors the pressure applied to the wrench mechanism by the fluid medium and relative to the angular displacement, such transducer means monitors the flow of the fluid medium to the wrench mechanism. Because these transducer means must be compatible with the network through which the fluid medium passes, conventional fluid fittings are utilized to house such transducer means. These fittings are much more easily installed than are conventional torque and angular displacement transducer arrangements, and provide another advantage relative thereto in that they are locatable remotely from the harsh physical environment which exists in proximity to the moving elements of the wrench mechanism.

Figure 1:
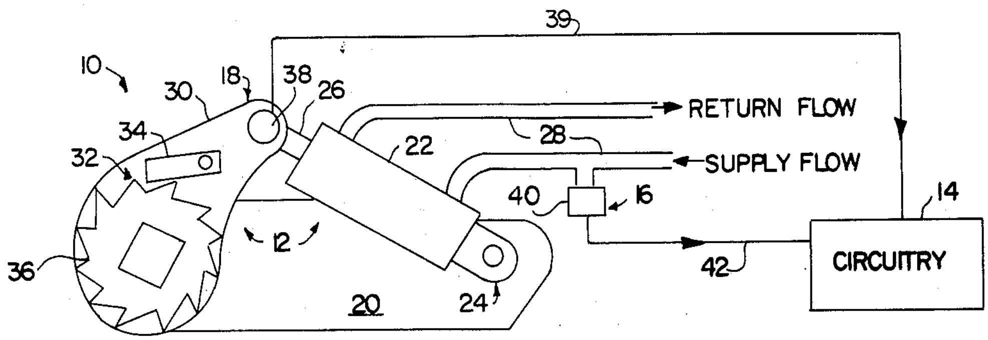
FIG. 1 is an overall view of a yield threshold controlled wrench apparatus wherein the torque and angular displacement transducers are each disposed in accordance with the invention.
Figure 2:
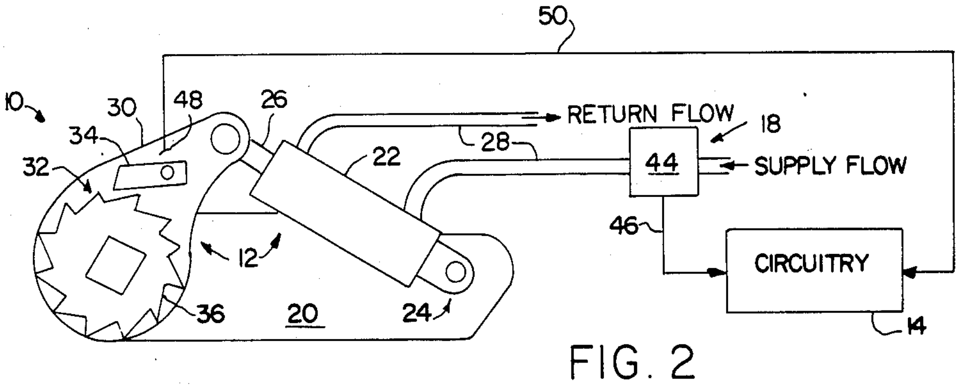
FIG. 2 is a overall view of a yield threshold controlled wrench apparatus wherein the angular displacement transducer is remotely disposed relative to the movable parts of the wrench mechanism, accordance with the invention.
Figure 3:
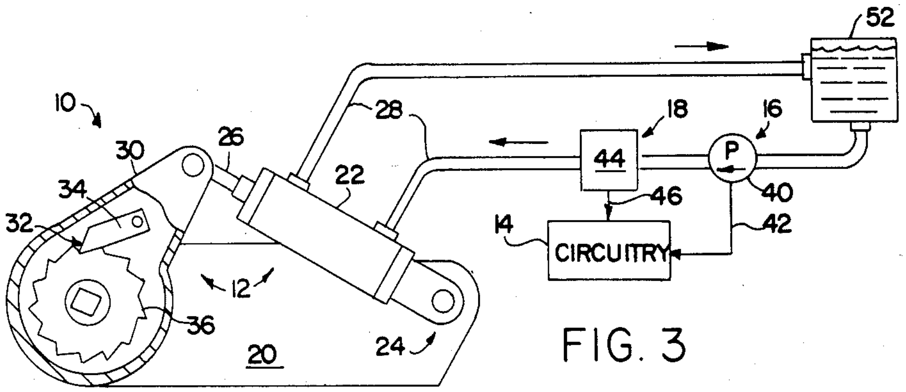
FIG. 3 is an overall view of a yield threshold controlled wrench apparatus wherein both the torque and angular displacement transducers are remotely disposed relative to the movable parts of the wrench mechanism, in accordance with the invention.

Some preferred embodiments of the invention are illustrated in FIGS. 1, 2 and 3, each of which relates to a particular yield threshold controlled wrench apparatus 10. Included in each apparatus 10 is a power wrench mechanism 12, such as the hydraulic power ratchet wrench shown, which provides a wrench head (not shown) for tightening a member of a threaded fastener to secure a plurality of parts, such as structural members, at a joint therebetween in a composite assembly (not shown). Each apparatus 10 also includes circuitry 14 for processing signal outputs from transducers 16 and 18 which sense the torque applied in tightening the fastener member and the angular displacement of the fastener member during tightening respectively, to derive an indication when a yield threshold has been reached in the joint. The yield threshold controlled wrench apparatus 10 is arranged on a base plate 20 upon which both the power wrench mechanism 12 and the signal processing circuitry 14 are mounted, even though the latter is shown to be removed therefrom for illustrative purposes, in FIGS. 1, 2 and 3.

In the wrench mechanism 12, one end of a hydraulic cylinder 22 is pivotally affixed to the base plate 20 at a location 24. A piston (not shown) is free to move axially within the cylinder 22 and has a rod 26 affixed thereto which extends axially through the other end of the cylinder 22. An axial force is developed by the piston in proportion to the hydraulic pressure applied over its circular end surface divided by the area of that surface, and is exerted through the rod 26 which moves axially as the actuating member of the wrench mechanism 12. The axial distance through which the piston and rod 26 move is directly proportional to the hydraulic flow into the cylinder 22 divided by the circular end surface area of the piston. Supply and return of the hydraulic flow for actuating the piston is provide through lines 28 connected at each end of the cylinder 22. Of course, the movement and force exerted by the piston may be in either axial direction of the cylinder 22 and control thereof ma be accomplished by interchanging the supply and return lines 28 in accordance with the direction desired.

At its extended end, the rod 26 is pivotally affixed to one end of a lever arm 30 through which the force developed by the cylinder piston is applied as torque to the wrench head. The other end of the lever arm 30 is fixedly attached to a ratchet means 32 for turning the wrench head in the rotational direction which tightens the fastener and turning independently of the wrench head in the other rotational direction. Any conventional design may be utilized for the ratchet means 32, such as the pawl 34 and sawtooth wheel 36 illustrated in FIGS. 1, 2 and 3, wherein the wrench head and sawtooth wheel 36 turn about the same axis.

The signal processing circuitry 14 may utilize any of the well-known approaches for detecting the yield threshold in the joint. With the approach utilized U.S. Pat. No. 4,211,120, the instantaneous slope of the torque versus angular displacement curve is continuously monitored while a fastener is tightened in a joint. When that slope reaches a predetermined percentage of the known slope at the yield point, the yield threshold indication occurs. In the approach of U.S. Pat. No. 4,104,779, the instantaneous change in area under the torque versus angular displacement curve is continuously monitored while a fastener is tightened in a joint. When that instantaneous change in area reaches a predetermined percentage of the known instantaneous change in area at the yield point, the yield threshold indication occurs. Of course, the yield threshold indication may be visual, such as a blinking light, or a shutdown control, such as a hydraulic pump shutoff switch.

In the FIG. 1 embodiments of the invention, a potentiometer 38 is utilized for the angular displacement transducer 18, as is conventional whether the yield threshold controlled wrench apparatus includes a manual or power wrench. However, the potentiometer 38 is not located along the turn axis of the wrench head, as is conventional in such yield threshold controlled wrench apparatus. To reduce the particularly harsh physical environment which would otherwise be encountered thereby along that turn axis, the potentiometer 38 is instead located along the pivot axis through the connection between the rod 26 and the lever arm 30. The angular displacement signal passes from the potentiometer 38 through wires 39 to the processing circuitry 14. Of course, the angular displacement of the wrench head is directly proportional to the relative angular displacement between the lever arm 30 and the rod 26, because the lever arm 30 is designed to transmit the torque without significant bending and its length is fixed.

As another embodiment of the invention, a pressure sensor 40 is utilized in the FIG. 1 arrangement to replace the strain gauges which are normally affixed to the lever arm 30 as the torque transducer 16 in conventional yield threshold controlled wrench apparatus. Although the pressure sensor 40 could be disposed in either hydraulic line 28, it is shown in the supply line 28 of the flow arrangement for actuating the cylinder piston to extend the rod 26 out from the cylinder 22. Signal output from the pressure sensor 40 passes to the signal processing circuitry 14 through wires 42.

Because of its location in the hydraulic line 28, pressure sensor 40 is completely remote from the generally harsh physical environment that would be encountered on the lever arm 30 by the previously mentioned strain gauges. Furthermore, the pressure sensor 40 is housed in a conventional hydraulic fitting and therefore, can be more readily replaced for maintenance purposes, as compared to such strain gauges, which are commonly affixed with bonding materials, such as epoxy. Of course, the torque applied to the wrench head is equal to the force applied to the lever arm 30 through the rod 26, multiplied by the length of the lever arm 30. Since the axial force applied through the rod 26 is equal to the pressure applied over the circular surface of the cylinder piston, divided by the area of that surface, the pressure sensed by transducer 16 is directly proportional to that force. Therefore, the signal output from the pressure sensor 40 relates directly to the torque that is applied to the wrench head and cumbersome signal processing thereof is unnecessary in the circuitry 14.

A flow sensor 44 is utilized as the angular displacement transducer 18, in the FIG. 2 embodiment of the invention instead of the potentiometer 38 which is utilized in one FIG. 1 embodiment of the invention. Although the flow sensor 44 could be disposed in either hydraulic line 28, it is show in the supply line 28 of the flow arrangement for actuating the cylinder piston to extend the rod 26 out from the cylinder 22. Because of its location in the hydraulic line 28, flow sensor 44 is completely remote from the particularly harsh physical environment encountered along the turn axis of the wrench head, as well as the somewhat harsh physical environment encountered by the potentiometer 38 along the pivot axis through the connection between the rod 26 and the lever arm 30 in Figure 1. Furthermore, the flow sensor 44 is housed in a conventional hydraulic fitting and therefore, can be more readily replaced for maintenance purposes as compared to the potentiometer 38.

As mentioned previously in regard to FIG. 1, the angular displacement of the wrench head is directly proportional to the relative angular displacement between the lever arm 30 and the rod 26, because the lever arm 30 is designed to transmit the torque without significant bending and its length is fixed. Of course, the relative angular displacement between the lever arm 30 and the rod 26 is the angle whose tangent equals the incremental change in length of the rod 26 divided by the fixed length of the lever arm 30. Since the incremental change in length of the rod 26 is equal to the volume of incremental flow supplied to the cylinder 22, divided by the fixed circular end surface area of the cylinder piston, the incremental flow sensed by transducer 18 is directly proportional to the incremental change in length of the rod 26. Therefore, the signal output from the flow sensor 44, which passes to the signal processing circuitry 14 through wires 46, relates directly to the angular displacement of the wrench head and cumbersome signal processing thereof is not necessary in the circuitry 14. In this embodiment, the torque transducer 16 is provided by strain gauges 48 which are affixed on the lever arm 30 and pass the signal output therefrom through wires 50, as is considered conventional for both manual and powered yield threshold controlled wrench apparatus.

The FIG. 3 embodiment of the invention, incorporates both the pressure sensor 40 for the torque transducer 16, as was previously disclosed in one FIG. 1 embodiment and the flow sensor 44 for the angular displacement transducer 18, as was previously disclosed in the FIG. 2 embodiment. Therefore, signals in direct proportion to both the torque applied to the wrench head and the angular displacement thereof are derived with such transducers disposed at completely remote locations from the generally harsh physical environment on the wrench mechanism 12. Furthermore, both the pressure sensor 40 and flow sensor 44 are housed in conventional hydraulic fittings and consequently, can be more readily replaced for maintenance purposes as compared to the strain gauges and potentiometer which are utilized in conventional yield threshold controlled wrench apparatus to monitor the torque and angular displacement respectively. The hydraulic lines 28 in FIG. 3 connect to a hydraulic reservoir 52 which completes the hydraulic network and would also be found in the yield threshold controlled wrench apparatus 10 of FIGS. 1 and 2. Of course, as in FIGS. 1 and 2, wires 42 and 46 pass the signals to the circuitry 14 from the pressure sensor 40 and the flow sensor 44 respectively.

From the foregoing description it should be apparent to those skilled in the art that explanations are provided therein as to how the previously stated objects of the invention are accomplished. The potentiometer 38 for sensing the angular displacement of the wrench head is disposed at a location along the pivot axis of the connection between the cylinder rod 26 and lever arm 30, away from the particularly harsh physical environment of its conventional location along the turn axis of the wrench head. To sense the angular displacement at a completely remote location from the generally harsh physical environment of the wrench mechanism 12, the flow sensor 44 is disposed in one of the hydraulic lines 28. Conventional strain gauges for sensing the torque applied to the wrench head are replaced with the pressure sensor 40 which is also disposed at a completely remote location from the generally harsh physical environment of the wrench mechanism 12, in one of the hydraulic lines 28. Of course, the pressure sensor 40 and the flow sensor 44 are more readily replaced for maintenance purposes as compared to the strain gauges and potentiometer 38 respectively, because they are housed in conventional hydraulic fittings.

What is claimed as novel is:

1. Yield threshold controlled wrench apparatus, comprising:

a base plate;

a hydraulic cylinder with a longitudinal axis and having one axial end thereof pivotally affixed to said base plate, said cylinder including an axially movable piston disposed internally therein, said piston having a rod affixed thereto and extending therefrom through the other axial end of said cylinder, the extended length of said rod from said cylinder being variable by applying hydraulic pressure to move said piston along said axis;

a lever arm having one end thereof pivotally affixed to the extended end of said rod;

a ratchet means affixed to said base plate for turning said wrench head in one rotational direction and turning independently of said wrench head in the other rotational direction, said ratchet means being fixedly connected to the other end of said lever arm through which torque is applied thereto;

a transducer for sensing a signal in proportion to the torque applied by said wrench head;

a transducer for sensing a signal in proportion to the angular displacement of said wrench head, said angular displacement transducer being disposed at a location other than along the rotational axis of said wrench head; and circuit means for processing said torque and said angular displacement signals to indicate when the yield threshold is reached.

2. The apparatus of claim 1 wherein said torque transducer is a hydraulic pressure sensor for deriving a signal in proportion to the force conveyed from said piston to said lever arm through said rod.

3. The apparatus of claim 1 wherein said angular displacement transducer is a potetiometer disposed at a location along the pivotal axis through said lever arm and said rod.

4. The apparatus of claim 3 wherein said torque transducer is a hydraulic pressure sensor for deriving a signal in proportion to the force conveyed from said piston to said lever arm through said rod.

5. The apparatus of claim 1 wherein said angular displacement transducer is a hydraulic flow sensor for deriving a signal in proportion to the tangent of the angle travelled by said wrench head due to the linear travel of said rod.

6. The apparatus of claim 5 wherein said torque transducer is a hydraulic pressure sensor for deriving a signal in proportion to the force conveyed from said piston to said lever arm through said rod.

7. Yield threshold controlled wrench apparatus, comprising:

a base plate;

a hydraulic cylinder with a longitudinal axis and having one axial end thereof pivotally affixed to said base plate, said cylinder including an axially movable piston disposed internally therein, said piston having a rod affixed thereto and extending therefrom through the other axial end of said cylinder, the extended length of said rod from said cylinder being variable by applying hydraulic pressure to move said piston along said axis;

a lever arm having one end thereof pivotally affixed to the extended end of said rod;

a ratchet means affixed to said base plate for turning said wrench head in one rotational direction and turning independently of said wrench head in the other rotational direction, said ratchet means being fixedly connected to the other end of said lever arm through which torque is applied thereto;

a transducer for sensing a signal in proportion to the angular displacement of said wrench head;

a hydraulic pressure sensor for deriving a signal in proportion to the force conveyed from said piston to said lever arm through said rod;

circuit means for processing said torque and said angular displacement signals to indicate when the yield threshold is reached.

8. The apparatus of claim 7 wherein said angular displacement transducer is a potentiometer disposed at a location along the pivotal axis through said lever arm and said rod.

9. The apparatus of claim 7 wherein said angular displacement transducer is a hydraulic flow sensor for deriving a signal in proportion to the tangent of the angle travelled by said wrench head due to the linear travel of said rod.

10. Yield threshold controlled wrench apparatus, comprising:

a power wrench mechanism driven by a pressurized fluid to turn a wrench head for tightening a threaded fastener;

transducer means for sensing a signal in proportion to the torque applied by said wrench head;

transducer means for sensing the flow of said fluid to said wrench mechanism to derive a signal in proportion with the angular displacement of said wrench head;

circuit means for processing said torque and said angular displacement signals to indicate when the yield threshold is reached.

11. The apparatus of claim 10 wherein sand torque transducer means monitors the pressure applied by said fluid to said wrench mechanism in proportion to the force developed thereby.

12. Yield threshold controlled wrench apparatus, comprising:

a power wrench mechanism divert by a pressurized fluid to turn a wrench head for tightening a threaded fastner:

transducer means for sensing a signal in proportion to the angular displacement of said wrench head wherein said transducer means monitors the flow is said fluid to said wrench mechanism in proportion to the movement of the actuating member therein;

transducer means for sensing the pressure applied by said fluid to said wrench mechanism to derive a signal in proportion with the torque applied by said wrench head; and circuit means for processing said torque and said angular displacement signals to indicate when the yield threshold is reached.

13. Yield threshold controlled wrench apparatus comprising:

a power wrench mechanism driven by a pressurized fluid to turn a wrench head for tightening a threaded fastener;

transducer means for sensing the flow of said fluid to said wrench mechanism to derive a signal in proportion with the angular displacement of said wrench head;

transducer means for sensing the pressure applied by said fluid to said wrench mechanism to derive a signal in proportion with the torque applied by said wrench head; and circuit means for processing said torque and said angular displacement signals to indicate when the yield threshold is reached.

* * * * *